United States Patent
Wolf et al.

(10) Patent No.: US 6,374,297 B1
(45) Date of Patent: Apr. 16, 2002

(54) METHOD AND APPARATUS FOR LOAD BALANCING OF WEB CLUSTER FARMS

(75) Inventors: Joel L. Wolf, Goldens Bridge; Philip Shi-lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,539

(22) Filed: Aug. 16, 1999

(51) Int. Cl.[7] .............................................. G06F 15/73
(52) U.S. Cl. ...................... 709/226; 709/235; 709/201; 709/229; 707/10
(58) Field of Search ................................ 709/226, 235, 709/201, 229; 707/10

(56) References Cited

U.S. PATENT DOCUMENTS

| | | | | |
|---|---|---|---|---|
| 5,283,897 A | * | 2/1994 | Georgiadis et al. | 709/105 |
| 5,539,883 A | * | 7/1996 | Allon et al. | 709/105 |
| 5,774,660 A | * | 6/1998 | Brendel et al. | 709/201 |
| 5,938,732 A | * | 8/1999 | Lim et al. | 709/229 |
| 6,023,722 A | * | 2/2000 | Colyer | 709/201 |
| 6,078,943 A | * | 6/2000 | Yu | 709/105 |
| 6,108,703 A | * | 8/2000 | Leighton et al. | 709/226 |
| 6,119,143 A | * | 9/2000 | Dias et al. | 709/201 |
| 6,138,159 A | * | 10/2000 | Phaal | 709/226 |
| 6,185,601 B1 | * | 2/2001 | Wolff | 709/203 |
| 6,253,230 B1 | * | 6/2001 | Couland et al. | 709/203 |
| 6,272,523 B1 | * | 8/2001 | Factor | 709/201 |
| 6,311,219 B1 | * | 10/2001 | Factor | 709/229 |

OTHER PUBLICATIONS

"Computer Performance Modeling Handbook", edited by Stephen S. Lavenberg, Academic Press, 1983, p. 69.

"The Apportionment Problem", 1988, Massachusetts Institute of Technology, pp. 108–110 and 77–78.

"The Greedy Procedure for Resource Allocation Problems: Necessary and Sufficient Conditions for Optimality", by A. Federgruen, et al., 1986 Operations Research Society of America, pp. 909–918.

Optimal Allocation of Multiple Class Resources in Computer Systems, by A.N. Tantawi, et al., 1988 ACM 0–897910254–3/88/0005/0253, pp. 253–260.

"The Placement Optimization Program: A Practical Solution to the Disk File Assignment Problem", by Joel Wolf, Performance Evaluation Review, vol. 17, #1, May 1989,. pp. 1–10.

"A Fast Selection Algorithm and the Problem of Optimum Distribution of Effort", by Zvi Galil, et al., Journal of the Association for Computing Machinery, vol. 24, No. 1, Jan. 1979, pp. 58–64.

(List continued on next page.)

*Primary Examiner*—Krisna Lim
(74) *Attorney, Agent, or Firm*—Scully, Scott, Murphy & Presser; Gail H. Zarick, Esq.

(57) ABSTRACT

A system and method for balancing a load among a web server farm includes two components: 1) a static component that functions to create the logical assignment of web sites to servers; and, 2) a dynamic component that performs real-time web site customer scheduling. The static component consists of two stages. First, based on web site demand forecasts, an optimization technique is employed for solving an apportionment problem to determine the optimal number of copies per web site. Second, a method is implemented which makes good quality logical assignments of these optimal number of web site copies to servers and may be run either in initial or incremental mode. The incremental mode is preferably run periodically, e.g., once per week or once per month, however, one could also run this mode when the cluster farm configuration changes, for example when new servers are added to the system. The dynamic component handles the real-time scheduling of web sites customers to servers, based on the output of the static component and on fluctuating web site customer demands. A probabilistic effect is aimed at assigning servers to newly arriving customers.

25 Claims, 7 Drawing Sheets

OTHER PUBLICATIONS

"Discrete Optimization Via Marginal Analysis", by Bennett Fox, Management Science, vol. 13, No. 3, Nov. 1966, pp. 210–216.

"The Complexity of Selection and Ranking in X+Y and Matrices with Sorted Columns", by Greg N, Frederickson, et al., Journal of Computer and System Sciences 24, (1982), pp. 197–209.

* cited by examiner

METHOD AND APPARATUS FOR LOAD BALANCING OF WEB CLUSTER FARMS

BACKGROUND OF THE INVENTION

1. Field of the Invention

The present invention relates generally to computer cluster load balancing systems and methods and, particularly, to a novel system and method for load balancing a farm of servers hosting clusters of web sites that enables maximal web site customer throughput.

2. Discussion of the Prior Art

In modern world-wide web-based ("web") computer systems, there currently exists the concept of a farm containing multiple web servers containing facilities for hosting multiple web sites. Sharing common resources such as web servers is very effective, because it is statistically unlikely that busy periods for one web site will correspond to those of another. However, the challenge remains to balance the load on the existing servers effectively, so that maximum customer throughput of the system may be achieved.

Overutilization of servers may cause either web site service interruptions to current customers or rejection of new customer demands, neither of which is desirable. On the other hand, underutilization is wasteful. Consequently, there is presented a real-time scheduling problem which is nontrivial and must be solved satisfactorily if one is to achieve the supposed advantages of a web farm. The server scheduling problem is made more complicated by the fact that some web sites are significantly more popular than others at any given time. Furthermore, this skewed distribution is not stationary: it varies significantly on a weekly, daily, hourly or even a more frequent basis, due to changing web site popularity and customer mix.

It is very likely that the popularity of the hottest web sites will be so great that it takes multiple servers to host them satisfactorily. Thus, it would be highly advantageous to exploit a requirement that multiple servers be available for hosting the highly popular web sites, particularly, by taking advantage of resulting multiple web site copies in order to solve the server load balancing problem very effectively.

SUMMARY OF THE INVENTION

The present invention pertains to an improved method for web site server load balancing by servers available for hosting the highly popular web sites, particularly, by taking advantage of multiple web site copies in order to solve the server load balancing problem very effectively.

According to the principles of the present invention, the load balancing method consists of two components: 1) a static component that functions to create the logical assignment of web sites to servers; and, 2) a dynamic component that performs real-time web site customer scheduling. The static component consists of two stages. First, based on web site demand forecasts, an optimization technique is employed for solving the "apportionment problem" to determine the optimal number of copies per web site. This technique is borrowed from the theory of resource allocation problems, such as described in T. Ibaraki and N. Katoh, "Resource Allocation Problems—Algorithmic Approaches," The MIT Press, 1988. Second, a method is implemented which makes good quality logical assignments of these optimal number of web site copies to servers. The set of all servers to which a particular web site is assigned is called its 'cluster'. Note that these clusters may overlap, i.e., the set of web servers is not partitioned. This logical assignment method may be run either in initial or incremental mode. The initial mode is appropriate when configuring a new web cluster farm. Those web sites with multiple copies are assigned first, using a graph-theoretic scheme based on a construct called "clique trees". Then single copy web sites are assigned, using a Least Loaded First ("LLF") scheme. The incremental mode allows for constraints which limit the number of copy and logical assignment changes, and is thus practical and appropriate for maintaining high quality web site-to-server assignments. A k-interchange heuristic such as described in the reference to G. Nemhauser and L. Wolsey entitled "Integer and Combinatorial Optimization", John Wiley and Sons, 1988, the contents and disclosure of which is incorporated by reference as if fully set forth herein, may be employed. The incremental mode is preferably run periodically, e.g., once per week or once per month, etc. However, one could also run this mode when the cluster farm configuration changes, for example when new servers are added to the system. In any case, the exact frequency will depend on the volatility of the web site demand forecasts and the growth in customer activity.

The dynamic component handles the real-time scheduling of web sites customers to servers, based on the output of the static component and on fluctuating web site customer demands. These fluctuations occur because customers arrive and depart, and they do so in a fashion which is not entirely predictable. Thus, according to the invention, a probabilistic approach is aimed at assigning servers to newly arriving customers. A customer who is assigned initially to a particular server will be allowed to complete his activity at that server. However, it is possible that the server will allow existing activity for a particular web site to quiesce naturally, future activity for that web site being assigned to a new server. The actual output of the dynamic component is a set of probabilistic routing choices, one for each web site. Thus, associated with the web site is a set of optimal routing probabilities, one for each server in the cluster, summing to one. A routing probability of 0 indicates that the relevant server is not hosting the web site at the time, i.e., customer activity for that web site is being handled by other servers in the cluster.

Once these routing probabilities have been established the actual assignments of new customers to web sites may be handled in a greedy fashion. If the routing probabilities happen to be equal, for example, this amounts to round-robin scheduling. For a given web site, the active hosts consist of those servers whose routing probabilities are positive. The other servers are not active for this web site-thus, limiting the increase of the spread of active hosts more than necessary. In particular it will never happen that two servers are both simultaneously active for two distinct web sites.

As with the static component there are two stages to the dynamic component: a first stage implementing an optimization technique for solving the "discrete class constrained resource allocation problem" ; and, a second stage that attempts to achieve these load balancing goals by basing the scheduling decision on which server should handle a new customer web site request on the pre-existing probalistic basis.

For the first stage, optimization techniques for solving the discrete class constrained resource allocation problem may be implemented in accordance with techniques described in the references A. Federgruen and H. Groenevelt, "The Greedy Procedure for Resource Allocation Problems: Necessary and Sufficient Conditions for Optimality", Operations Research, vol. 34, pp. 909–918, 1986 and, A. Tantawi, D.

Towsley and J. Wolf, "Optimal Allocation of Multiple Class Resources in Computer Systems", ACM Sigmetrics Conference, Santa Fe NM, 1988, the contents and disclosure of each of which are incorporated by reference as if fully set forth herein. Particularly, these references describe techniques that may be used for determining optimal load balancing goals at any given moment, given the logical assignments of web sites to servers. Specifically, the output of this stage is the optimal number of web site customers on each server. This problem is repeatedly solved whenever the overall load on the servers changes significantly. Fortunately, the method is fast and incremental in nature.

According to the second stage for achieving load balancing goals, the scheduling decision on which server should handle a new customer web site request is performed on the pre-existing probabilistic basis: Specifically, those servers to which the web site is logically assigned and which already have current activity for that web site are examined, and servers are chosen amongst those servers greedily, according to their routing probabilities. If the routing probabilities are all equal, then the resulting round-robin policy amounts to assigning customers in cyclic fashion. This approach naturally tends to balance the load fairly well. However, periodically load balancing using the greedy probabilistic approach alone may degrade too much relative to the optimal goal. When the quality of the server load balancing differs from the goal by more than a predefined threshold, or perhaps when the actual performance at the various servers varies too far from optimally balanced, the real-time method is initiated. This method is also graph-theoretic, and has the effect of shifting load from relatively overloaded to relatively underloaded servers.

A typical but simplified example of the dynamic phase output will help to illustrate our technique: Consider a scenario in which the static component of the method has assigned web site A to servers 1 and 2, web site B to servers 2 and 3, web site C to servers 3 and 4, and a less popular web site D to server 1 alone. Suppose a significant amount of new customer for web site D arrives. The greedy probabilistic method for web site D is by necessity trivial. It must schedule all new customer traffic for web site D on server 1, thus increasing the load on that server. Suppose that this action overloads server 1 past the predefined threshold, relative to optimal. If server 4 is relatively underloaded, the method would probalistically assign a fixed amount of new traffic for web site A from server 1 to 2, the same amount of new traffic for web site B from server 2 to 3, and the same amount of new traffic for web site C from server 3 to 4. The actual amount of shifted new customer traffic is the minimum of five quantities. The first is the amount of existing traffic for web site A on server 1. The second is the amount of existing traffic for web site B on server 2. The third is the amount of existing traffic for web site C on server 3. The fourth is the amount of traffic necessary to reduce the load on server 1 to optimal. And the fifth is the maximum amount of new traffic necessary to increase the load on server 4 to optimal. The following directed graph

1—A→>2—B→>3—C→>4 represents this shift of customer load neatly, with the nodes corresponding to servers and the directed arcs corresponding to web sites. The effect of this three-step modification, in theory, is to lower the load on server 1 by some fixed amount, hopefully enough to yield acceptable traffic on that server, and to raise the load on server 4 by a similar amount. There should be essentially no net effect on servers 2 and 3. It should be understood that the actual traffic in the revised scenario are statistical in nature, and thus, may vary somewhat from what is predicted.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
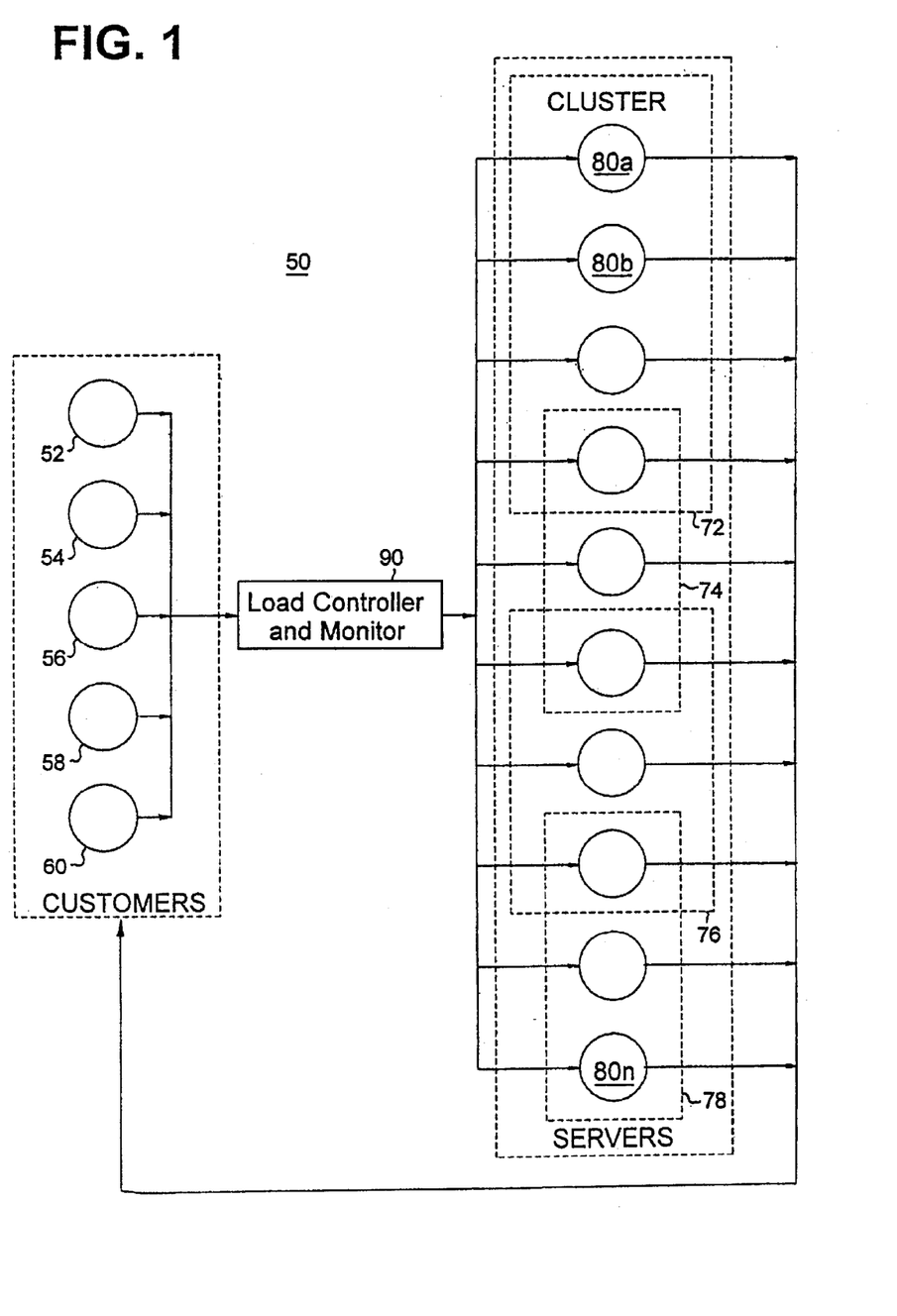
FIG. 1 illustrates the overall architecture diagram of the server load balancing system of the invention.

As illustrated in FIG. 1, the present invention implements a two stage process for effectively balancing the load across a web server farm 50 consisting of multiple servers 80a–80n designed to handle multiple customers 52–60 of multiple web sites. In the first static stage, web sites are first logically assigned to overlapping clusters of servers in a relatively static fashion according to various specified eligibility rules and constraints, in variable numbers. Preferably, these servers are clustered according to a static phase algorithm into relevant web site groupings 72–78. According to the invention, a number of customers 52–60 having web browser and computing resources pass requests for access to a web site on to a load controller and monitor device 90. In a second dynamic stage, the load controller decides which, of the possibly several servers handling the site, will be used to handle the customer. The active assignment of customers visiting the various web sites is varied in response to changing real-time demands, while obeying the cluster structure as determined from the first static stage. The output from this service at the cluster farm 50 is then piped back to the individual customer. Preferably, the customer to server assignment is maintained throughout the customer's stay at a particular site.

Dynamic Load Balancing Scheme

A description of the second dynamic server load balancing scheme of the invention is first presented with a description of the first static scheme being described in greater detail herein. According to the invention, the dynamic aspect of the process assumes the logical server assignments of web sites as a given, and then reacts dynamically to fluctuating web site customer demands, making probabilistic decisions on which servers should handle new customers for a particular web site. Some of the notation used throughout the description is first introduced:

Letting W denote the number of web sites and S denote the number of servers of the server farm, $A=[a(i,j)]$ denotes the logical assignments of web site copies to servers. That is, either the web site is logically assigned to the server or not. Thus A is a W×S matrix with elements $a(i,j)$ having a value equal to "1" if a copy of web site i exists on server j, and "0" if a copy of web site i does not exist on server j. Furthermore, associated with each server j is a maximum acceptable number L(j) of concurrent web site customers which number depends on the performance characteristics of the servers, and is chosen to ensure that the real-time scheduling problem of servicing the web site customers within a reasonable response time may be solved successfully. To avoid reaching this threshold while maintaining effective server load balancing, a response time function F[j] is employed for each server j which progressively penalizes loads approaching L(j). Such a function may be based on any reasonable queuing assumptions, for example an M/M/1 queue such as described in the reference S. Lavenberg, "Computer Performance Modeling Handbook", Academic Press, 1983, the contents and disclosure of which are incorporated by reference herein. Typical response time functions F[j] are convex and increasing on the set $\{0, \ldots, L(j)\}$, and satisfy the constraint F[j] (0)=0. Assuming at a given moment that there is a number c(i) representing the number of customers visiting web site i, this number is further broken down into a number c(i,j) which represents the number of customers at server j visiting web site i. Thus c(i) is the sum over j of c(i,j) and c(i,j)=0 whenever a(i,j)=0. Furthermore, a number C denotes the total number of all web site customers, so that C is the sum over i of all c(i).

Optimal Load Balancing

The servers may be regarded as optimally balanced given the current load and logical web site-to-server assignments when the following objective function:

$$\sum_{j=1}^{S} F[j]\left(\sum_{i=1}^{W} x(i, j)\right)$$

is minimized subject to the following constraints:

$x(i,j)$ in $\{0, \ldots, L(j)\}$;     1)

$$\sum_{j=1}^{S} x(i, j)) = c(i); \text{ and,} \quad 2)$$

$x(i,j)=0$ if $a(i,j)=0$.     3)

Here, $x(i,j)$ is a decision variable representing the hypothetical number of customers of web site i which might be hosted on server j. The first constraint limits the acceptable values of $x(i,j)$. The second constraint ensures that the total number of web site i customers equals the actual number of such customers. The third constraint ensures that the logical web site-to-server assignments are respected. Note that for the optimal solution, $$X(j) = \sum_{i=1}^{W} x(i, j))$$

represents the desired customer load on server j. According to the invention, the ultimate goal is to ensure that the optimal load X(j) and the actual load, which is the sum over i of c(i,j), are always close to each other for each server j.

The optimization problem described above is a special case of the so-called discrete class constrained resource allocation problem with the "classes" corresponding to the web sites. The problem is characterized as being: 1) discrete because of the first constraint; 2) a resource allocation problem because of the second constraint; and, 3) class constrained because of the third constraint. As shown independently in the above-described references entitled "The Greedy Procedure for Resource Allocation Problems: Necessary and Sufficient Conditions for Optimality", and "Optimal Allocation of Multiple Class Resources in Computer Systems", discrete class constrained resource allocation problems may be solved exactly and efficiently using a graph-theoretic optimization method. An overview of the method as described in "Optimal Allocation of Multiple Class Resources in Computer Systems", as it applies to the special case above is now presented for the following reasons: first, the method will be called as part of the dynamic component scheme, in order to set the target server loads; and, second, the graph technique of the original method is mimicked to some extent in the second stage of the dynamic component scheme. Assuming a feasible solution exists, the method proceeds in C steps. A directed graph is created and maintained throughout the course of the method. The nodes of the graph are the servers $1, \ldots, S$, plus a dummy node which is denoted as node 0. Additionally, a partial feasible solution $\{x(i,j)|i=1, \ldots W, J=0, \ldots, S\}$ is created and modified. Initially, this partial feasible solution is set for each i to have $x(i,0)=c(i)$, and $x(i,j)=0$ for all $j=1, \ldots, S$. Thus, all resources reside at the dummy node. The directed graph at any step has a directed arc from a node j1 in $\{0, \ldots, S\}$ to a node j2 in $\{1, \ldots, S\}$ if there is at least one web site i satisfying the following:

1) a(i1,j1)=a(i1,j2)=1;

2) x(i1,j1)>0; and, $$\sum_{i=1}^{W} x(i, j2) < L(j2) \quad 3)$$

It should be understood that there may be directed arcs from node 0, but there are no directed arcs to node 0. The general step of the method finds, among all nodes j in $\{1, \ldots, S\}$ for which there is a directed path from 0 to j, the node for which the first difference $$F[j]\left(\sum_{i=1}^{W} x(i, j) + 1\right) - F[j]\left(\sum_{i=1}^{W} x(i, j)\right)$$

is minimal. If no such node exists, the method terminates with an infeasible solution. Otherwise, an acyclic directed path is chosen from 0 to the optimal node. For each directed arc (j1, j2) in this path, the value of x(i1,j1) is decremented by 1 and the value of x(i1,j2) is incremented by 1 for an appropriate web site i1. Performing this step over all directed arcs has the effect of removing one unit of load from the dummy node, and adding one unit of load to the optimal node. There is clearly no net effect on the load of the intermediate nodes. Thus the dummy node serves as a staging area for the resources, one of which is released in each step into the server nodes. Bookkeeping is then performed on the graph, which may modify some directed arcs and potentially disconnect certain nodes, and the step is repeated. After C steps the method terminates with an optimal solution to the original discrete class constrained resource allocation problem. Feasibility is guaranteed because of the conditions on the arcs in the directed graph as described in the reference "Optimal Allocation of Multiple Class Resources in Computer Systems". The values x(i,j), suitably normalized, yield the probabalistic routing values p(i,j).

Given these optimal server loads, the real-time scheduling method is now described in greater detail. Clearly, demand is increased by one when a new customer enters a web site. Similarly, demand is decreased by one when a customer leaves a web site, however, the scheduling method does not react directly to these since reductions in demand will not, by itself, result in server overloading. Normally, handling demand increases may be accomplished by employing the aforementioned greedy method. In other words, if a new customer for web site i is to be added, that server j satisfying a(i,j)=1 with a positive probability p(i,j) is chosen if the ratio c(i,j)/p(i,j) is minimal. However, periodically this approach may degrade. To check this, the discrete class constrained resource allocation problem described above to obtain optimal server loadings given the current web site demands is solved. Reindexing these servers according to decreasing values of:

$$\sum_{i=1}^{W} c(i, j)) - X(j)$$

puts them in order of most overloaded to most underloaded, relative to optimal. To fix notation, suppose that the first D1 servers are relatively overloaded, and the last D2 servers are relatively underloaded. The middle D-D1-D2 servers must therefore be optimally loaded. If the values $$\sum_{i=1}^{W} c(i, j)) - X(j)$$

differ from zero by more than some fixed threshold T according to any reasonable norm, the load balancing component of the dynamic method will be initiated. Examples of reasonable norms include the value:

$$B_1 = \sum_{i=1}^{W} c(i, 1) - X(1)$$

of the relatively most overloaded server; the sum $$B_2 = \sum_{j=1}^{D1} \left( \sum_{i=1}^{W} c(i, j) - X(j) \right)$$

of all the relatively overloaded servers; and, the sum of squares $$B_3 = \sum_{j=1}^{D} \left( \sum_{i=1}^{W} c(i, j) - X(j) \right)^2$$

etc., where $B_1$, $B_2$, $B_3$ denote the values of this norm, i.e., an indicator of load balancing "badness". The choices of the badness factor $B_1$, $B_2$, $B_3$ and value of the threshold T are a matter of design implementation, and these or others may be readily determined by those skilled in the art.

The dynamic component is also graph-theoretic, maintaining at all times a directed graph G defined as follows: The nodes correspond to the servers. (There is no dummy node.) For each pair j1 and j2 of distinct nodes, there is a directed arc from j1 to j2 provided there exists at least one web site i1 for which:

1) a(i1, j1)=a(i1, j2)=1;
2) c(i1, j1)>0; and, $$\sum_{i=1}^{W} c(i, j2) < L(j2) \quad 3)$$

As before, the existence of a directed arc signifies the potential for probablistically reducing the load on one server, increasing the load on another without exceeding the load capacity, and leaving the loads on other servers unaffected.

Thus, according to a preferred embodiment, the method includes a routine for moving load from relatively overloaded to relatively underloaded servers. Particularly, the method has a main routine described with respect to FIG. 1, and a subroutine described with respect to FIG. 2.

Figure 2:
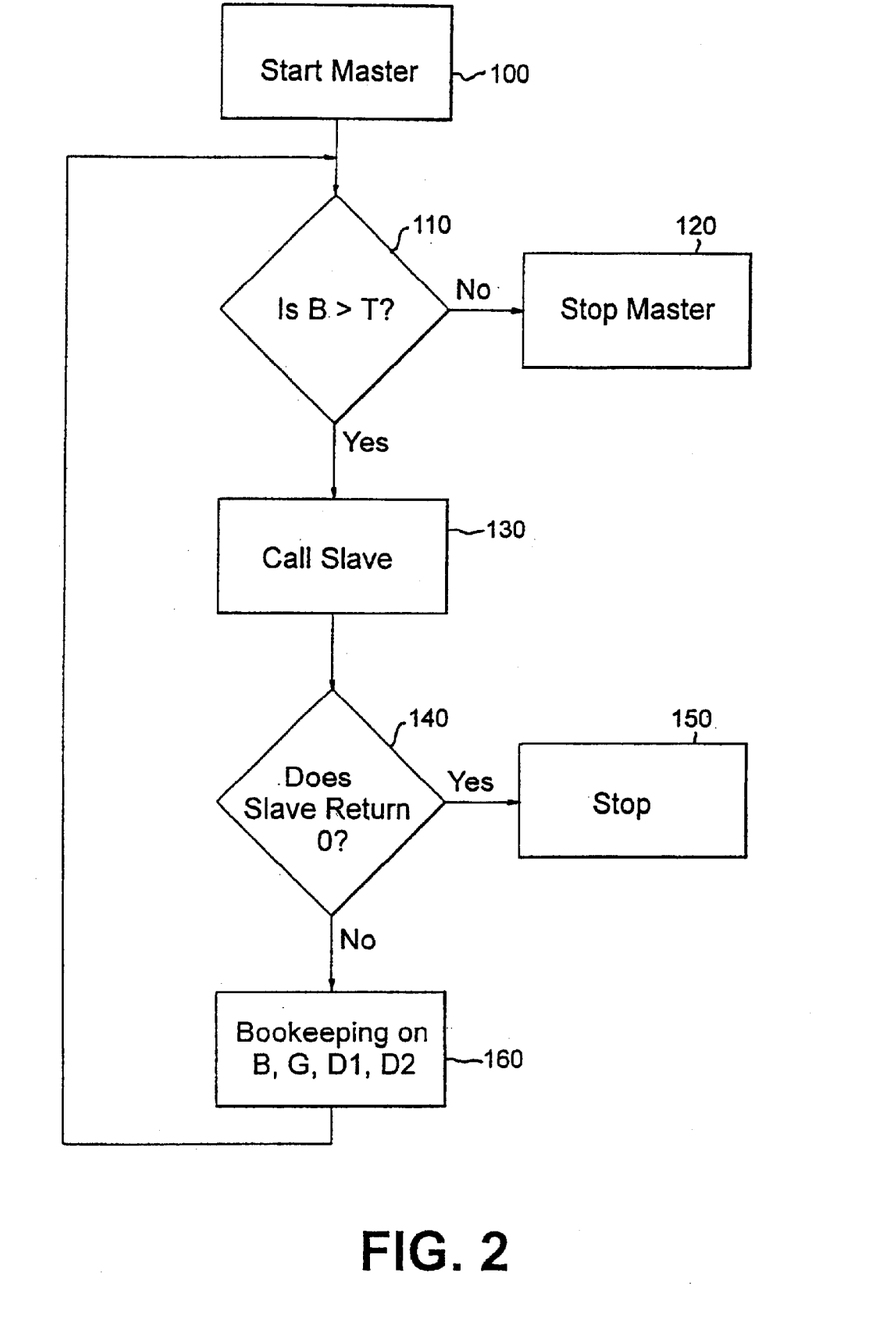
FIG. 2 is a flowchart of the MASTER routine in the dynamic phase scheme.

Considering FIG. 2, a MASTER routine is first set as indicated at step 100. In step 110, it is checked whether or not the badness B exceeds the threshold T or not. If not, the MASTER routine ends at step 120. However, if the badness B exceeds the threshold T, the MASTER routine calls the SLAVE routine as indicated at step 130 and described in greater detail herein with respect to FIG. 2. This SLAVE routine is either successful in making improvements to the load balancing, in which case it returns 1, or unsuccessful, in which case it returns 0. Thus, at step 140, FIG. 1, the MASTER routine checks to see the value returned by SLAVE. If the value returned is 0, the MASTER routine ends at step 150. If the value returned is 1, there is bookkeeping to be done in step 160 to the badness value B, the directed graph G, and the overlaoded and underloaded servers D1 and D2. The MASTER routine then returns to step 110. Preferably, the MASTER routine continues its work until either the threshold is no longer exceeded, or the call to SLAVE is not successful (which means that no load balancing is identified, and the value 0is returned).

Figure 3:
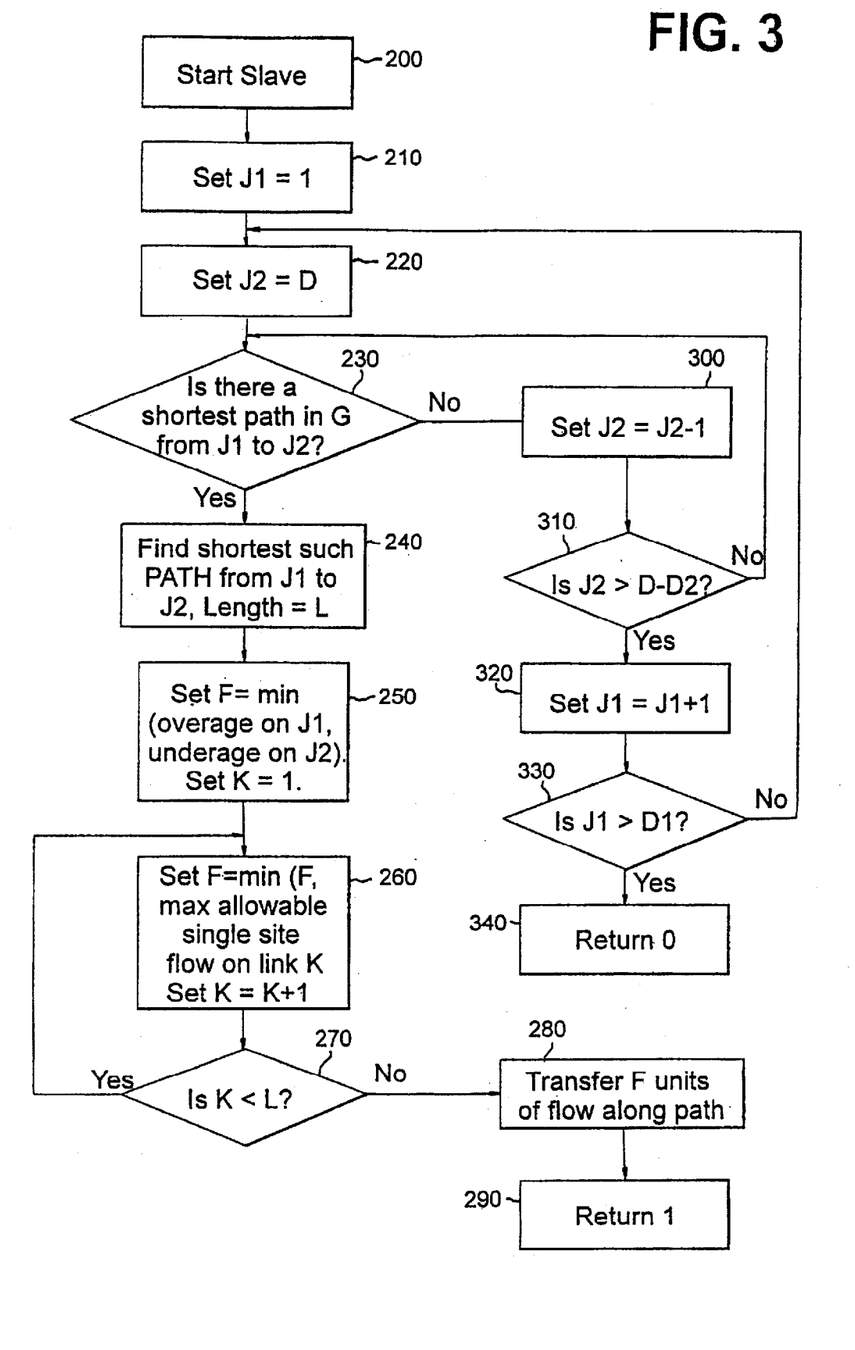
FIG. 3 is a flowchart of the SLAVE routine in the dynamic phase scheme.

Considering FIG. 3, there is illustrated the preferred SLAVE routine, which starts with step 200. At step 210, FIG. 2, the index j1 (for the overloaded servers) is initialized to 1, and at step 220, the index j2 (for the underloaded servers) is iniatialized to D. The j1 index will be incremented, and the j2 index decremented. At step 230, a test is performed to determine if there is a (shortest) path in the directed graph G from j1 to j2. If there is a (shortest) path in the directed graph G from j1 to j2, the SLAVE routine proceeds with step 240 where the shortest path is identified, and its length set to L. At step 250, a variable F representing an amount of flow (customers) is set to a value representing the minimum of the oversupply of flow (customers) at server j1 and the undersupply of flow (customers) at server j2. Then, the index k on the length of the shortest path is set to be 1. Succeeding tests may decrease the value of F further. Specifically, at step 260, F is set to be the minimum of itself and the maximum allowable single site flow on the kth link in the shortest path. Then, the index k is incremented by 1. In step 270, a check is made to determine whether the index k is less than L, i.e., whether SLAVE has reached the last link in the shortest path or not. If the last link in the shortest path has not been reached, control returns to step 260 where k is incremented and the value of F is set. If the last link in the shortest path has been reached, then the process proceeds to step 280 where the amount of new customer flow F is transferred along the shortest path, thus, helping to rebalance the load. Then, the SLAVE returns a value 1, as indicated at step 290, to indicate a successful call to the subroutine.

Returning to step 230, if no (shortest) path in the directed graph G from j1 to j2 could be found, the process proceeds to step 300. This is considered a (partial) failure, and other indexes j1 and j2 need to be considered. Thus, in step 300, j2 is decremented by 1 so that the next most underloaded server may be considered. Then, at step 310, a determination is made as to whether j2 has passed its least underloaded server, namely D-D2. If j2 has not passed its least underloaded server, the SLAVE routine returns to step 230 where minimum path determination and flow transfer steps are repeated. If j2 has passed its least underloaded server, j1 is incremented by 1 as indicated at step 320. At step 330, it is checked whether j1 has passed its least overloaded server, namely D1. If j1 has not passed its least overloaded server, the SLAVE routine returns to step 220 where j2 is again set to D. If j1 has passed its least overloaded server, SLAVE has failed, and a 0 is returned at step 340 indicating failure of the subroutine. The order of the "nested do loops" in the SLAVE routine causes shifts of load from the most relatively overloaded servers to the most relatively underloaded servers to occur as early as possible. Note that the requirement to proceed along a shortest directed path keeps the load balance lengths as small as possible, and implies that each directed arc involves the transfer of a different web site. The scheme will have the effect of balancing the load to a larger degree than would be possible without transfering web sites dynamically.

An example is now provided to help illustrate the load balancing method according to the method as described. Consider a six (6) server configuration supporting four (4) web sites, with web site-to-server assignments listed in Table 1 as follows:

TABLE 1

Sample web site to server logical assignments:

| Web Site | Servers |
|---|---|
| A | 1, 2, 3 |
| B | 2, 5 |
| C | 3, 4 |
| D | 5, 6 |

Figure 4:
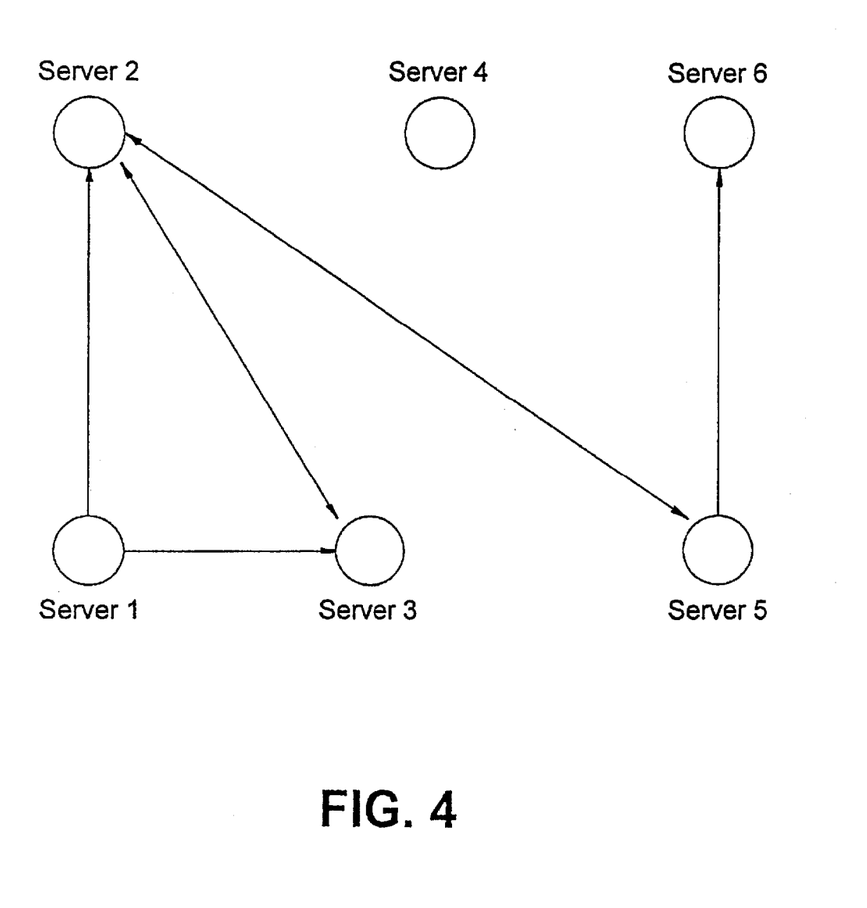
FIG. 4 is a sample of the directed graph G in the dynamic phase scheme.

Suppose the following scenario: Server 1 is loaded to capacity with web site customers, and is thus relatively overloaded. Server 6 is relatively underloaded. Servers 1,2 and 3 are each hosting web site A. Servers 2 and 5 are hosting web site B. Web site C currently has no customers. Web site D currently has customers on server 6, but not on server 5. That is, server 5 is not active. FIG. 4 illustrates the directed graph G maintained in accordance with the invention at this moment. As shown in FIG. 4, there are illustrated directed arcs from server 1 to servers 2 and 3, and in both directions between servers 2 and 3 themselves. There are no arcs directed towards server 1, because server 1 is at capacity. There are directed arcs in both directions between servers 2 and 5. There are no directed arcs in either direction between servers 3 and 4, because of the lack of current appropriate customers of that web site. There is a directed arc from server 5 to server 6, but none in the opposite direction. Under these conditions, a load balancing transfer from server 1 to 2 to 5 to 6 would occur, probablistically transferring future customers of 3 web sites. The shortest directed path between servers 1 and 6 happens to also be the only such directed path. As a result of this load balance the overall server load balancing would be improved.

It should be understood that successive calls to find optimally balanced server loadings will involve substantially similar problem instances. Fortunately, there exist natural incremental variants of the described solution technique, so that the computational complexity may be kept within reason. Actually, it is also possible to shorten the execution time of the dynamic component scheme by replacing the calls to the discrete class constrained resource allocation problem method with calls to a simpler method, at the expense of some accuracy in setting the server optimal loading goals. Specifically, consider the corresponding resource allocation problem in which the classes have been removed (or more precisely, conglomerated into a single class). Thus, it is desirable to minimize the objective function $$\sum_{j=1}^{S} F[i](x(j))$$

subject to the following constraints:

1) x(j) in $\{0, \ldots, Lj\}$; and, $$\sum_{j=1}^{S} x(j)) = C. \qquad 2)$$

By definition, the value of the objective function for this problem is less than or equal to the corresponding value for the class constrained problem, since one constraint has been relaxed. Of course, relaxing this constraint additionally means that the solution obtained may not be actually implementable. However, if the web site-to-server assignment method described in greater detail below is performed well, the optimistic assumption that the values x(j) and X(j) will be close is generally justified. Thus, each value x(j) may be used as a surrogate for X(j), even though it may not correspond exactly to a truly feasible solution. The point is that this new optimization problem is solvable by a fast method with better computational complexity such as described in the reference B. Fox, "Discrete Optimization via Marginal Analysis", Management Science, vol. 13, pp. 210–216, 1966 the contents and disclosure of which is incorporated by reference herein. Due to its incremental nature, this method computes the optimal solution for all values between 1 and C as it proceeds. Thus, these may be stored and simply looked up as needed, rather than being computed each time.

It should be understood that even faster algorithms exist for this resource allocation problem such as described in Z. Galil and N. Megiddo, "A Fast Selection Method and the Problem of Optimum Distribution of Efforts", Journal of the ACM, vol. 26, pp. 58–64, 1981, and, G. Frederickson and D. Johnson, "The Complexity of Selection and Ranking in X+Y and Matrices with Sorted Columns", Journal of Computer and System Science, vol. 24, pp. 197–208, 1982. However, the algorithms described in these references are not incremental in nature. The reader is additionally referred to the above-mentioned reference "Resource Allocation Problems—Algorithmic Approaches," for further details. If all the servers are homogeneous in the sense that they have identical performance, the complexity may be reduced further still. In this case the subscripts may be dropped and, further, L=L(j) and F=F[j] defined for each server j. The resource allocation problem may then be solved trivially (modulo integrality considerations), with each xj=C/S.

Efficient Static Assignment of Web Sites to Servers:

A description of the static scheme of the invention which assigns web sites to servers, is now presented. The goal of the static scheme is to facilitate the job of the real-time scheduler. Using the notation provided hereinabove, the output of this stage is simply the 0,1 assignment matrix A=[a(i,j)]. The static method proceeds in two stages. In the first stage, a decision is made as to how many copies of each web site to create, given the forecasted demands for each web site and the total number of web site copies allowed in the system. Thus, the row sums of the matrix A is determined. Specifically, it is first assumed that the W web sites have been indexed in terms of decreasing forecasted demand, i.e., $\Phi(1) \geq \ldots \geq \Phi((W))$. This assumption assumes that good quality forecasts may be provided which is a task orthogonal to the invention itself. Let K denote the acceptable number of web site server copies in the system. The goal is to compute the number K(i)>=1 of required copies for each web site i. Making each K(i) roughly proportional to $\Phi(i)$ with the constraint that $$K = \sum_{i=1}^{W} K(i)$$

is a resource allocation problem known as the apportionment problem. Many schemes have been proposed for this apportionment problem. For example, Webster's monotone divisor method may be adopted such as described in the above-mentioned "Resource Allocation Problems—Algorithmic Approaches" reference. However, it is understood that alternative schemes may be implemented.

Next, the numbers of the web site copies computed in the first stage are assigned to servers. This second stage has two possible modes. The "initial" mode is used to configure a new system from scratch, on e for which no web sites have yet been assigned to servers. This mode is described in below. The "incremental" mode is used on a periodic basis to adjust existing web site-to-server assignments based on revised web site demand forecasts. In order to ensure that implementation of these adjustments is practical, there is provided a constraint on the number of new web site copies which can be assigned to servers. The primary goal in both modes is to achieve high connectivity of the undirected graph H defined as follows: The nodes correspond to the servers. For each pair j1 and j2 of distinct nodes, there is an arc between j1 and j2 provided there exists at least one web site i1 for which a(i1,j1)=a(i1,j2)=1. This condition mimics condition 1 in the definition for the directed graph G. The notion is that H serves as an effective surrogate for G, since a good dynamic component scheme typically ensures that conditions 2 and 3 in the definition of G will be satisfied whenever 1 is. It is understood that a first goal is to increase connectivity by minimizing the diameter of the graph H, which is the maximum distance between any pair of nodes.

Figure 5:
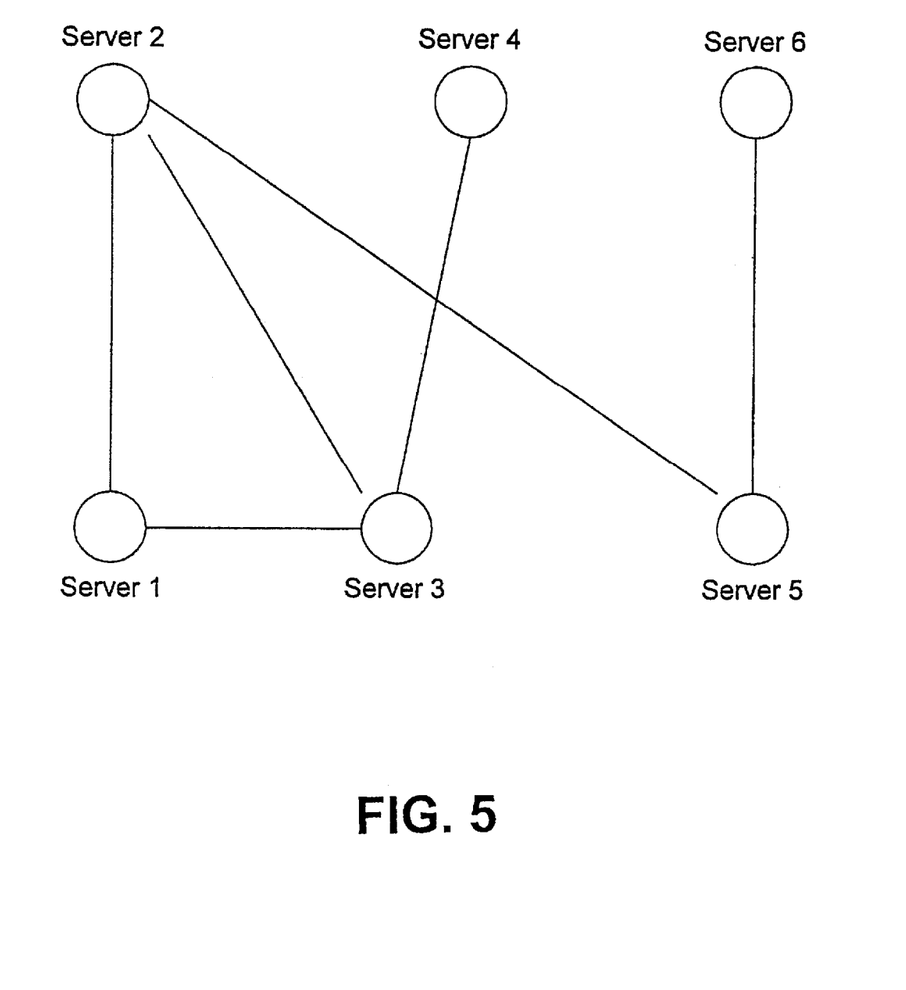
FIG. 5 is a sample of the undirected graph H in the static phase scheme.

FIG. 5 illustrates the graph H for the six (6) server example described above with respect to Table 1. Note the similarities to the directed graph G illustrated in FIG. 4. There is, however, an arc in FIG. 5 between servers 3 and 4, even though FIG. 4 has no comparable directed arc. A secondary goal is to keep the forecasted load on each server roughly proportional to its maximum customer capacity. To this end, the per copy forecasted load on each web site i is approximated by the following:

$$\Delta(i) = \frac{\phi(i)}{K(i)}.$$

It is intended that the values of the sum $$\sum_{i=1}^{W} a(i,j) \frac{\Delta(i)}{L(j)}$$

be equalized for each server j. Finally, it must be ensured that the storage capacity of each server is not exceeded. Denoting SC(j) as the storage capacity of server j and s(i) as the size of web site i (in the same units), then the storage capacity test requires the following check:

$$\sum_{i=1}^{W} a(i,j)s(i) \leq S(j)$$

for each server j.

Apportionment Problem

In the solution of the apportionment problem there is defined the following:

$$\Phi = \sum_{i=1}^{W} \phi(i)$$

which is the sum of all the web site demand forecasts. It is desired to keep K(i) nearly proportional to $\Phi(i)$ for each web site i, and there is the sum of $$K = \sum_{i=1}^{W} K(i)$$

web sites in all. Thus, preferably, the proportions $$\frac{K(i)}{\phi(i)} \approx K\Phi$$

are maintained. Stated differently, the goal in solving the apportionment problem is to give each web site i a number of server copies K(i) as close as possible to its quota K $\Phi(i)/\Phi$ while creating $$K = \sum_{i=1}^{W} K(i)$$

server copies altogether. Unfortunately, the quota for any given web site need not be integral, but K(i) must be. There are rounding algorithms which ensure that K(i) always falls between the floor and ceiling of its quota. For example, Hamilton's scheme as described in the above-mentioned "Resource Allocation Problems—Algorithmic Approaches" reference is one of these algorithms. The above-mentioned Webster monotone divisor method, however, may be implemented to avoid certain paradoxes that may be encountered which is now described as follows: Initialize each K(i)=1. The general step is to find the web site i* for which $\Phi(i)/(K(i)+0.5)$ is maximized, and increment K{i*} by 1.

If $$K = \sum_{i=1}^{W} K(i),$$

the procedure terminates, otherwise the general step is repeated. Webster's method is basically a greedy method, and the denominator K(i)+0.5 is one of several possible so-called divisors which can be used as criteria in selecting the next web site to increment. It is understood that other divisors may be implemented such as provided in Hamilton and Adams algorithms described in the above-mentioned "Resource Allocation Problems Algorithmic Approaches" reference.

Initial Assignment Method

Figure 7:
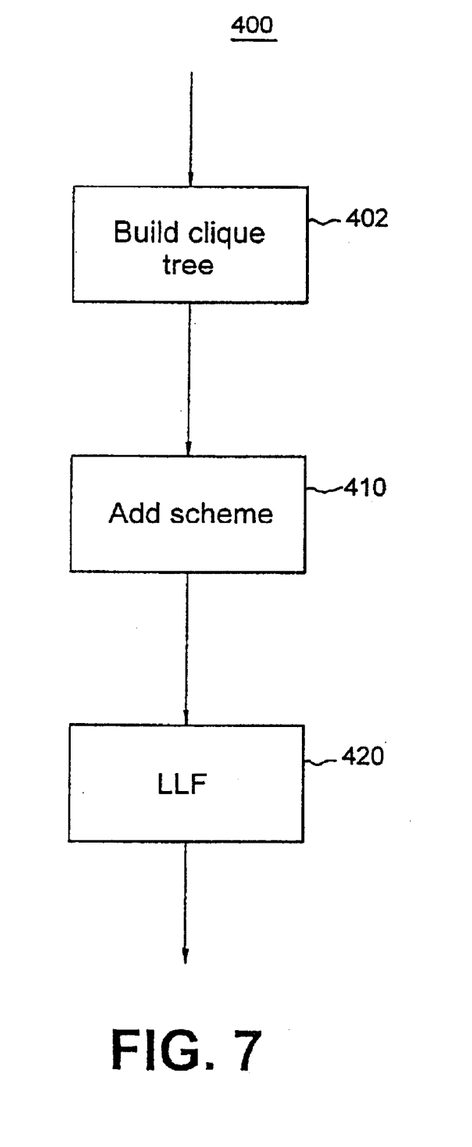
FIG. 7 illustrates a flow diagram of the initial assignment portion of the static phase of the invention; and, FIG. 8 illustrates a flow diagram of the incremental assignment portion of the static phase of the invention.

As indicated in FIG. 7, in an initial mode 400, the high connectivity of the graph H is achieved from scratch in three steps: a first step 402 for producing a clique tree and an initial graph; a second step 410 implementing a greedy ADD scheme to reduce the diameter of the graph; and, a third step 420 for assigning single copies using a scheme herein referred to as LLF. The first two schemes are for handling multicopy web sites, in other words web sites j for which K(j)>1. The last scheme handles the remaining single copy web sites. Each of these steps are now described in turn.

Each node of the clique tree comprises a set of servers such that each has a copy of a common web site. These are the cliques. Each server will be contained in at most one node in the tree. However, aside from the root node, one copy of this common web site will also be placed on another preexisting node in the tree, and an edge will thereby be created. More specifically, the algorithm proceeds as follows: All copies of the most popular multiple copy web site are first assigned to different servers and these servers form the root node of the clique tree. The next hottest multiple copy web site is then considered. Each copy except one is assigned different empty servers, and these servers form a branch node in the clique tree. The remaining copy is assigned to the relatively least loaded server with sufficient storage capacity in the root node. This copy is called the connection copy, because it creates an edge in the clique tree. New clique tree nodes are created in this manner, assigning the connection copy to the node closest to the root which has a server with sufficient storage capacity. Within that node, the relatively least loaded server with sufficient storage capacity is chosen. The process is repeated until there no longer remains any empty servers or multiple copy web sites. The leaf nodes represent less popular web sites with replications. During the final step of the tree building, the web site may have more copies (excluding the connection copy) than the number of servers remaining unassigned. The assignment of those excess copies will be addressed in the next step. The ADD method handles the remaining multiple copy web sites in two stages, with each stage being greedy in nature. For each multiple copy web site with copies left to be assigned, all but at most one copy may be paired off. The paired copies in the first stage are treated in order of decreasing popularity. In the second stage, the remaining single copies are treated in the same order.

i. For each pair of remaining web site copies, there is chosen from the set of servers with sufficient capacity that pair (j1, j2) with maximal distance. Ties are adjudicated by picking a pair which is the least connected in the following sense: Let M(j(i)) denote the number of distinct copies of multiple copy web sites assigned to server j(i). Then the connectivity of the pair (j1,j2) is defined as C(j1,j2)=M(j1)+M(j2). Intuitively, the connectivity of the graph is measured by counting the number of potential paths originating from a given server j(i).

ii. Any remaining single copy of an multiple copy web site is placed on a server so as to maximally decrease the diameter of the graph. Ties are adjudicated in a manner similar to that described in i.

The remaining single copy web sites have no effect on the diameter of H and they are assigned in order to balance the load only. The scheme is greedy, and called Least Loaded First (LLF). In other words, the next single copy of a web site is assigned to that server with sufficient capacity for which the ratio of forecasted load to maximum customer capacity is minimal.

There is now illustrated an example of the first static stage of the inventive method. First, there is produced a clique tree and an initial graph. The greedy ADD scheme is then implemented to reduce the diameter of the graph. Finally, single copies are assigned using the LLF scheme. For purposes of description, it is assumed a system of S=13 servers and W=11 web sites exists with all web sites being of equal size. Additionally, the servers themselves are identical, with a storage capacity of, for example, two (2) web sites per server and a customer capacity of ten (10). Assume that the allowable number of copies is K=25. The forecasted demands and numbers of required copies of each web site are presented in Table 2. It is understood that, for this example, the forecasts are normalized, and the number of copies are computed using Webster's Monotone Divisor Method.

TABLE 2

Sample web site forecast demand and number of copies

| Web site | Forecast % | Copies |
|---|---|---|
| A | 16 | 4 |
| B | 13 | 3 |
| C | 11 | 3 |
| D | 10 | 3 |
| E | 9 | 2 |
| F | 9 | 2 |
| G | 9 | 2 |
| H | 8 | 2 |
| I | 8 | 2 |
| J | 4 | 1 |
| K | 3 | 1 |

The ultimate assignment of web sites to servers is given by the following matrix A=

1111000000000
1000110000000
0010000011000
0010000011000
0001000000100
0000100000010
0000010000001
0000001000010
0000000010001
0000000001000
0000000100000 and the adjacency-matrix representation of the clique tree is 0111110000000
1011001100000
1101000011000
1110000000100

```
1000010000010
1000100000001
0100000100000
0100001000000
0010000001000
0010000010000
0001000000000
0000100000000
0000010000000
```

It is understood that these two types of matrices may be generated as part of standard techniques for representing graphs as described in above-mentioned reference to G. Nemhauser and L. Wolsey entitled "Integer and Combinatorial Optimization".

Figure 6:
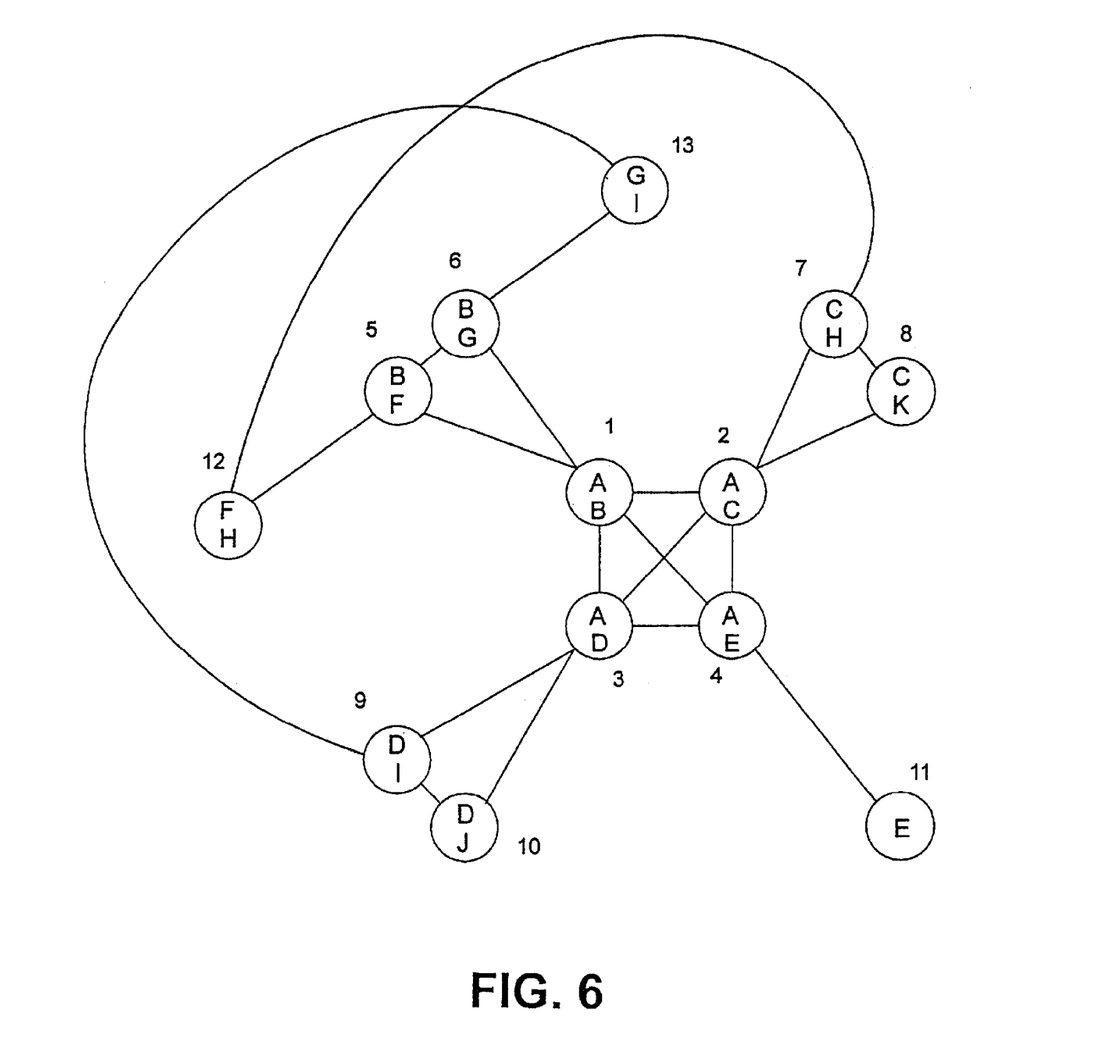
FIG. 6 depicts an example construction process of the graph H in the static phase scheme.

FIG. 6 illustrates the graph H representing an example static assignment of web sites to servers of the server farm in accordance with the sample web site forecast of Table 2. The four copies of the most popular web site A are assigned to servers 1, 2, 3 and 4. These four servers form the root node of the clique tree. The next most popular web site is B, which has 3 copies. One of these is assigned to one of the servers in the root node, server 1, as the connection copy of the web site. The other two copies of the web site B are assigned to servers 5 and 6, respectively. These two servers form a branch node of the clique tree. Web site C also has three copies, one of which is assigned to server 2 as a connection copy to the branch node consisting of servers 7 and 8. Similarly, there are three copies of web site D, one of which is assigned to server 3 as a connection copy to the branch node consisting of servers 9 and 10. There are two copies of web site E. The connection copy is assigned to server 4 while the other is assigned to branch node server 11. At this point in the assignment process, the storage capacities of servers in the root node have been reached, and thus it is no longer possible to assign connection copies of the remaining web sites to the root node. Therefore, one copy of web site F is assigned to server 5 and another is assigned to server 12. Similarly, one copy of web site G is assigned to server 6 and another to server 13. The clique tree is now complete.

As an initial assignment of web sites to server an ADD phase is performed. The two copies of web site H are assigned to servers 7 and 12. it is noted that these servers belong to different nodes in the clique tree. The assignments reduce the graph diameter, previously determined by the distance between these servers. The two copies of web site I are assigned to servers 9 and 13. There are no single copy multiple copy web sites to deal with, so the ADD phase is now complete. Finally, single copy web sites J and K are assigned to servers 10 and 8 respectively, by LLF.

Figure 8:
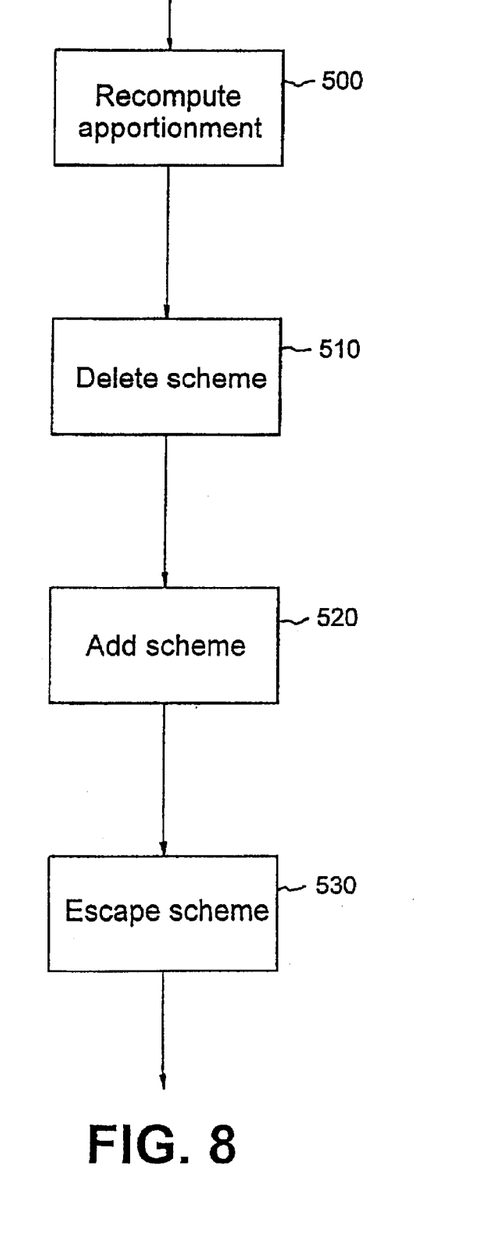

The incremental method will now be implemented to retain high connectivity in the graph H on a periodic basis, e.g., day-by-day or week-by-week, etc. The idea is that periodic revisions to the web site demand forecasts will, in turn, cause changes in the solution to the apportionment problem. Thus, some web sites will need to lose server copies, some will gain server copies, and some of the existing web site copies may be moved from one server to another. The method 500 is illustrated in FIG. 8 and involves the performance of three steps. The net number of new web site copies on servers is tracked, which is forced to be bounded by some fixed threshold U. This threshold is designed to avoid excessive revisions to the web site-to-server assignments and is a matter of design implementation. This, in turn, is intended to make the incremental mode scheme practical from the standpoint of implementation.

As shown in FIG. 8, for the first step 510, there is performed the greedy removal of server copies from net-loss web sites using a scheme referred to as DELETE. In other words, that web site copy which increases the diameter of the graph H least is always removed. A scheme for adjudicating ties may be implemented as would be apparent to skilled artisans. For the second step 520, there is performed the greedy addition of server copies to net-gain web sites, using the method ADD. The number of new web site copies is then computed. If this number is greater than or equal to U, the method terminates. Otherwise, a third step 530 for applying a k-interchange heuristic on the entire set of web site copies, is invoked. Such a scheme, herein referred to as INTERCHANGE, may be based on the k-interchange heuristic such as described in the above-mentioned reference to G. Nemhauser and L.

Wolsey entitled "Integer and Combinatorial Optimization", for example. A k-interchange heuristic is an iterative improvement scheme which attempts to avoid being trapped in local minima while achieving low computational costs. Assuming a predefined metric on the search space of feasible solutions, plus an existing initial feasible solution, the method successively searches the neighborhoods of distance 1, 2 and so on about that solution. If no improvement is found within a predetermined number of neighborhoods, the method stops. Otherwise, the improved solution is adopted as the new solution, and the process repeats. For the present invention, a natural metric may be imposed in which the distance between two sets of web site-to-server assignments A1 and A2 is the number of matrix entries on which they are not equal. Thus, modifying an assignment by moving a single web site copy results in a new assignment a distance of 1 away. Swaps of web site copies are of distance 2, etc. The feasibility constraints are on load balancing and server storage capacity. If either of the following conditions exist: 1) no further improvements to the diameter of H or its connectivity are possible, or 2) the number of moves would exceed a threshold U, the method terminates. In the latter case, the final move decision is aborted. Details on a similar k-interchange heuristic may be found in the reference to J. Wolf, "The Placement Optimization Program", "ACM Sigmetrics Conference," Berkeley Calif. 1989.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. A method for balancing load across a plurality of web servers of a web server farm hosting multiple web sites designed to handle multiple customers, said method comprising the steps of:

logically assigning each web site to one or more servers forming a server cluster structure for said web site according to various predetermined criteria; and, dynamically assigning customers visiting the various web sites to servers in response to changing real-time customer demand for access to said web sites, while obeying said server cluster structure.

2. The method as claimed in claim 1, further including the step of determining a first server hosting an active and relatively overloaded web site, a last server hosting an active and relatively underloaded web site, and intermediate loaded servers, wherein the dynamically assigning step includes the step of repeatedly transferring a sequence of active customer web site assignments to servers, in a manner which maintains the approximate loadings of active web sites among the intermediate servers.

3. The method as claimed in claim 1, further including the steps of:
determining a badness factor indicating deviation of said loading relative to an optimal server loading;
comparing said badness factor with a predetermined threshold value; and,
when, said threshold is exceeded, initiating said dynamic assignment step.

4. The method as claimed in claim 1, wherein said logical assignments of web sites to one or more servers facilitates frequent implementation of said dynamic assignment step.

5. The method as claimed in claim 3, wherein said dynamic assigning step further includes the step of computing a shortest path distance from the relatively overloaded web site to the relatively underloaded web site.

6. The method as claimed in claim 5, wherein said dynamically assigning steps includes pushing flow from one site to another site according to standard network flow techniques.

7. The method as claimed in claim 4, further including the step of logically maintaining an underlying assignment graph setting forth a topology of web server assignments to said server cluster structure.

8. The method as claimed in claim 7, wherein said logically assigning step includes optimizing the topology of said underlying assignment graph based on estimates of the relative customer activity of the various web sites.

9. The method as claimed in claim 8, wherein said estimates of the amounts of activity of the various web sites is computed via standard forecasting techniques, yielding estimates in varying time units including one of months, weeks, days and quarter hours.

10. The method as claimed in claim 7, wherein the logical assignment of overlapping clusters is updated periodically via a greedy algorithm, said greedy algorithm including steps for reoptimizing the topology of the underlying assignment graph in order to react to changing customer activity rates at the various web sites.

11. The method as claimed in claim 10, wherein said greedy algorithm includes a step of minimizing a maximum diameter of said underlying assignment graph.

12. The method as claimed in claim 7, wherein said various predetermined criteria include estimates of relative amounts of activities of the various web sites, a number of servers in the farm, and properties of the servers in the farm, said logically assigning step determining an optimal cardinality of the clusters to be logically assigned.

13. The method as claimed in claim 11, wherein said optimal cardinality is computed via a resource allocation problem technique.

14. A program storage device readable by a machine, tangibly embodying a program of instructions executable by the machine to perform method steps for balancing load across a plurality of web servers of a web server farm hosting multiple web sites designed to handle multiple customers, said method steps comprising:
logically assigning each web site to one or more servers forming a server cluster structure for said web site according to various predetermined criteria; and,
dynamically assigning customers visiting the various web sites to servers in response to changing real-time customer demand for access to said web sites, while obeying said server cluster structure.

15. The program storage device as claimed in claim 14, further including the step of determining a first server hosting an active and relatively overloaded web site, a last server hosting an active and relatively underloaded web site, and intermediate loaded servers, wherein the dynamically assigning step includes the step of repeatedly transferring a sequence of active customer web site assignments to servers, in a manner which maintains the approximate loadings of active web sites among the intermediate servers.

16. The program storage device as claimed in claim 14, further including the steps of:
determining a badness factor indicating deviation of said loading relative to an optimal server loading;
comparing said badness factor with a predetermined threshold value; and,
when, said threshold is exceeded, initiating said dynamic assignment step.

17. The program storage device as claimed in claim 14, wherein said logical assignments of web sites to one or more servers facilitates frequent implementation of said dynamic assignment step.

18. The program storage device as claimed in claim 16, wherein said dynamic assigning step further includes the step of computing a shortest path distance from the relatively overloaded web site to the relatively underloaded web site.

19. The program storage device as claimed in claim 18, wherein said dynamically assigning steps includes pushing flow from one site to another site according to standard network flow techniques.

20. The program storage device as claimed in claim 17, further including the step of logically maintaining an underlying assignment graph setting forth a topology of web server assignments to said server cluster structure.

21. The program storage device as claimed in claim 20, wherein said logically assigning step includes optimizing the topology of said underlying assignment graph based on estimates of the relative customer activity of the various web sites.

22. The program storage device as claimed in claim 20, wherein the logical assignment of overlapping clusters is updated periodically via a greedy algorithm, said greedy algorithm including steps for reoptimizing the topology of the underlying assignment graph in order to react to changing customer activity rates at the various web sites.

23. The program storage device as claimed in claim 20, wherein said various predetermined criteria include estimates of relative amounts of activities of the various web sites, a number of servers in the farm, and properties of the servers in the farm, said logically assigning step determining an optimal cardinality of the clusters to be logically assigned.

24. The program storage device as claimed in claim 23, wherein said optimal cardinality is computed via a resource allocation problem technique.

25. A system for balancing load across a plurality of web servers of a web server farm hosting multiple web sites designed to handle multiple customers, said system comprising:
means for logically assigning each web site to one or more servers forming a server cluster structure for said web site according to various predetermined criteria; and,
control device for receiving a customer request for access to a web site, monitoring activity at each said servers, and dynamically assigning a customer visiting a web site to a server in accordance with changing real-time customer demand for access to said web site, while obeying said server cluster structure.

* * * * *

UNITED STATES PATENT AND TRADEMARK OFFICE
CERTIFICATE OF CORRECTION

PATENT NO. : 6,374,297 B1
DATED : April 16, 2002
INVENTOR(S) : J. Wolf et al.

It is certified that error appears in the above-identified patent and that said Letters Patent is hereby corrected as shown below:

<u>Title page,</u>
Item [54], Title, should read "METHOD AND APPARATUS FOR LOAD BALANCING OF WEB CLUSTER FARMS" should read -- SYSTEM HAVING STATIC AND DYNAMIC COMPONENTS FOR LOADING BALANCING ACROSS WEB SERVERS OF WEB CLUSTER FARM HOSTING MULTIPLE WEB SITES --

<u>Column 14,</u>
Line 52, "0010000011000" should read -- 0100001100000 --

<u>Column 16,</u>
Line 15, "Wolsey entitled "Integer and Combinatorial Optimization", for example." should end previous paragraph of line 14, not begin new paragraph at line 16.

Signed and Sealed this

Eighth Day of October, 2002

*Attest:*

JAMES E. ROGAN
*Attesting Officer*    *Director of the United States Patent and Trademark Office*